United States Patent
Akimoto et al.

(10) Patent No.: US 12,246,675 B2
(45) Date of Patent: Mar. 11, 2025

(54) PORTABLE DEVICE, DRIVING ASSISTANCE SYSTEM, CONTROL METHOD, AND STORAGE MEDIUM STORING A CONTROL PROGRAM

(71) Applicants: TOYOTA JIDOSHA KABUSHIKI KAISHA, Toyota (JP); DENSO CORPORATION, Kariya (JP)

(72) Inventors: Kohtaroh Akimoto, Toyota (JP); Katsuharu Tachibana, Nagoya (JP); Koji Nakao, Okazaki (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 265 days.

(21) Appl. No.: 17/930,847

(22) Filed: Sep. 9, 2022

(65) Prior Publication Data

US 2023/0094573 A1 Mar. 30, 2023

(30) Foreign Application Priority Data

Sep. 30, 2021 (JP) .................... 2021-161299

(51) Int. Cl.
*B60R 25/24* (2013.01)
*B60R 25/01* (2013.01)
*B60W 30/18* (2012.01)
*G05D 1/00* (2024.01)

(52) U.S. Cl.
CPC ............ *B60R 25/245* (2013.01); *B60R 25/01* (2013.01); *B60W 30/18* (2013.01); *G05D 1/0016* (2013.01); *G05D 1/0022* (2013.01); *G05D 1/021* (2013.01); *B60R 2325/10* (2013.01); *B60R 2325/205* (2013.01); *B60W 2556/45* (2020.02)

(58) Field of Classification Search
CPC ... B60R 25/245; B60R 25/01; B60R 2325/10; B60R 2325/205; B60W 30/18; B60W 2556/45; G05D 1/0016; G05D 1/0022; G05D 1/021
See application file for complete search history.

(56) References Cited

U.S. PATENT DOCUMENTS

| 7,471,187 | B2* | 12/2008 | Nakashima | G07C 9/00309 340/12.51 |
| 10,272,875 | B2* | 4/2019 | Lee | H04L 67/12 |
| 2006/0061459 | A1* | 3/2006 | Kawamura | G07C 9/00309 340/426.36 |
| 2006/0224290 | A1* | 10/2006 | Nakashima | B60R 25/24 701/1 |

(Continued)

FOREIGN PATENT DOCUMENTS

JP 2018-52188 A 4/2018

*Primary Examiner* — Naeem Taslim Alam
(74) *Attorney, Agent, or Firm* — Oblon, McClelland, Maier & Neustadt, L.L.P.

(57) ABSTRACT

A portable device, including: an unlocking portion configured to enable an operation for unlocking a door of a vehicle; and a processor, wherein, when the unlocking portion is operated in a case in which a reception sensitivity of a predetermined signal that is transmitted by wireless communication from the vehicle is a first sensitivity, the processor is configured to change the reception sensitivity to a second sensitivity that is a higher reception sensitivity than the first sensitivity.

5 Claims, 8 Drawing Sheets

(56) References Cited

U.S. PATENT DOCUMENTS

| | | | |
|---|---|---|---|
| 2009/0160608 A1* | 6/2009 | Inoue | E05B 81/78 340/5.64 |
| 2017/0217404 A1* | 8/2017 | Lee | B60R 25/245 |
| 2017/0316533 A1* | 11/2017 | Goldman-Shenhar | G08G 1/205 |
| 2023/0067747 A1* | 3/2023 | Mandl | G07C 9/00944 |

* cited by examiner

PORTABLE DEVICE, DRIVING ASSISTANCE SYSTEM, CONTROL METHOD, AND STORAGE MEDIUM STORING A CONTROL PROGRAM

CROSS-REFERENCE TO RELATED APPLICATION

This application is based on and claims priority under 35 USC 119 from Japanese Patent Application No. 2021-161299 filed on Sep. 30, 2021, the disclosure of which is incorporated by reference herein.

BACKGROUND

Technical Field

The present disclosure relates to a portable device, a driving assistance system, a control method and a storage medium storing a control program.

Related Art

Japanese Patent Application Laid-Open (JP-A) No. 2018-52188 discloses a parking assist device that can finely adjust the parked position of a vehicle.

In the technique of JP-A No. 2018-52188, due to the vehicle receiving a signal relating to a remote operation from a remote terminal such as a smartphone or the like, the vehicle executes parking assist control that automatically parks the vehicle at a target position.

Here, in order to specify that the operation is a driving assistance operation by a legitimate user of the vehicle, it is thought to make the driving assistance operation, which advances or reverses the vehicle in accordance with the above-described operation of the remote terminal, executable under the condition that the portable device, which can be operated in order to carry out unlocking and locking of the door of the vehicle and the like, has received a predetermined signal from the vehicle.

However, if the user who possesses the portable device is away from the vehicle by a predetermined distance or more, the portable device cannot receive the predetermined signal, and driving assistance cannot be carried out.

In the above-described case, in order to have the portable device receive the predetermined signal, it is thought to have the user who possesses the portable device approach the vehicle to within a predetermined distance therefrom, or to increase the reception sensitivity of the portable device in order to be able to receive the predetermined signal. However in the former case, the user must approach the vehicle to within a predetermined distance therefrom, which is inconvenient for the user. Accordingly, in order to have the portable device receive the predetermined signal in the above-described case, the latter option of increasing of the reception sensitivity of the portable device is preferable.

Further, in a case of increasing the reception sensitivity of the portable device, if operation of the lock button of the portable device, which button is for locking the vehicle door, is made to be a condition, it is possible for the door to be unlocked on the basis of the operation of a door button by a third party who is not a legitimate user, in a state in which the user is recognized when the door are locked. Therefore, this is not preferable from the standpoint of security.

SUMMARY

An object of the present disclosure is to provide a portable device, a driving assistance system, a control method and a storage medium storing a control program which can ensure convenience for the user without any detriment to the security of the vehicle, in a case in which driving assistance is carried out under the condition of having detected a portable device that carries out locking and unlocking of the door of the vehicle.

A portable device of a first aspect includes: an unlocking portion configured to enable an operation for unlocking a door of a vehicle; and a changing section that, when the unlocking portion is operated in a case in which a reception sensitivity of a predetermined signal that is transmitted by wireless communication from the vehicle is a first sensitivity, changes the reception sensitivity to a second sensitivity that is a higher reception sensitivity than the first sensitivity.

The portable device of the first aspect has the unlocking portion configured to enable an operation for unlocking a door of a vehicle. Further, when the unlocking portion is operated in a case in which the reception sensitivity of a predetermined signal that is transmitted by wireless communication from the vehicle is a first sensitivity, the changing section changes the reception sensitivity to a second sensitivity that is a higher reception sensitivity than the first sensitivity. As a result thereof, at the portable device, the reception sensitivity is changed to the second sensitivity in a state in which it has been recognized that the user of the vehicle has unlocked the door. Therefore, in a case of carrying out driving assistance under the condition that the portable device has been detected, convenience for the user can be ensured without any detriment to the security of the vehicle.

In a portable device of a second aspect, in the first aspect, the changing section changes the reception sensitivity to the first sensitivity in a case in which a predetermined time has elapsed since changing the reception sensitivity to the second sensitivity.

In the portable device of the second aspect, the changing section changes the reception sensitivity to the first sensitivity in a case in which a predetermined time has elapsed since changing the reception sensitivity to the second sensitivity. As a result thereof, at the portable device, even if the user of the vehicle forgets that the reception sensitivity has been changed to the second sensitivity, the reception sensitivity is automatically changed to the first sensitivity after a predetermined time elapses, and therefore, security risks to the vehicle can be reduced.

A portable device of a third aspect is the portable device of the first or second aspect that includes a locking portion configured to enable an operation for locking the door of the vehicle, wherein the changing section changes the reception sensitivity to the first sensitivity when the locking portion is operated in a case in which the reception sensitivity is the second sensitivity.

The portable device of the third aspect has the locking portion configured to enable an operation for locking the door of the vehicle. When the locking portion is operated in a case in which the reception sensitivity is the second sensitivity, the changing section changes the reception sensitivity to the first sensitivity. As a result thereof, at the portable device, the reception sensitivity can be changed to the first sensitivity in accordance with operation of the portable device. Therefore, due to the reception sensitivity being changed to the first sensitivity at the time when the user moves away from the vehicle, security risks to the vehicle can be reduced.

A driving assistance system of a fourth aspect includes: the portable device of any one of the first through third aspects; a vehicle that can communicate wirelessly with the portable device; and a user terminal that can communicate with the vehicle, wherein the vehicle executes a driving assistance operation of advancing or reversing the vehicle in accordance with operation of the user terminal, in a case in which it has been confirmed that the portable device has received a predetermined signal that has been transmitted.

In the driving assistance system of the fourth aspect, in a case in which it has been confirmed that the portable device has received a predetermined signal that has been transmitted, the vehicle executes the driving assistance operation of advancing or reversing the vehicle in accordance with operation of the user terminal. As a result thereof, in the driving assistance system, in a situation in which the user of the vehicle is outside of the vehicle, in a case in which the driving assistance operation of advancing or reversing the vehicle is executed in accordance with operation of the user terminal under the condition that the portable device has been detected, convenience for the user can be ensured without any detriment to the security of the vehicle.

In a control method of a fifth aspect, according to which a computer executes processings including: receiving an operation for unlocking a door of a vehicle; and, when the operation is carried out in a case in which a reception sensitivity of a predetermined signal that is transmitted by wireless communication from the vehicle is a first sensitivity, changing the reception sensitivity to a second sensitivity that is a higher reception sensitivity than the first sensitivity.

A sixth aspect is a non-transitory storage medium on which a control program is recorded. The control program executable by a computer to perform processings, the processing including: receiving an operation for unlocking a door of a vehicle; and, when the operation is carried out in a case in which a reception sensitivity of a predetermined signal that is transmitted by wireless communication from the vehicle is a first sensitivity, changing the reception sensitivity to a second sensitivity that is a higher reception sensitivity than the first sensitivity.

In the portable device, the driving assistance system, the control method and the storage medium storing a control program is recorded relating to the present disclosure, in a case in which driving assistance is carried out under the condition of having detected a portable device that carries out locking and unlocking of the door of a vehicle, convenience for the user can be ensured without any detriment to the security of the vehicle.

BRIEF DESCRIPTION OF THE DRAWINGS

An exemplary embodiment of the present disclosure will be described in detail based on the following figures, wherein.

DETAILED DESCRIPTION

A driving assistance system 10 relating to the present embodiment is described hereinafter.

Figure 1:
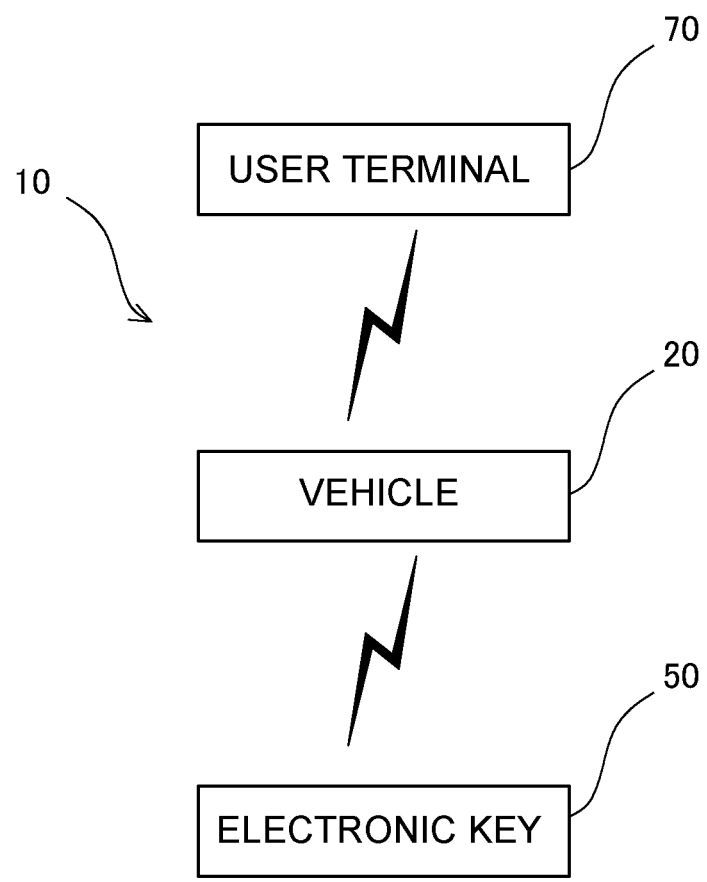
FIG. 1 is a drawing illustrating the schematic structure of a driving assistance system relating to a present embodiment.

FIG. 1 is a drawing illustrating the schematic structure of the driving assistance system 10 relating to the present embodiment.

As illustrated in FIG. 1, the driving assistance system 10 includes a vehicle 20, an electronic key 50 and a user terminal 70. The vehicle 20 and the electronic key 50 can communicate wirelessly with one another, and the vehicle 20 and the user terminal 70 can communicate wirelessly with one another.

The vehicle 20 may be any of a gasoline-powered vehicle, a hybrid vehicle or an electric vehicle. In the present embodiment, as an example, the vehicle 20 is a gasoline-powered vehicle.

The electronic key 50 is a portable equipment that the user of the vehicle 20 possesses. Remote operation of the vehicle 20 (e.g., locking and unlocking of the doors) can be carried out at the electronic key 50 through wireless communication with the vehicle 20. The electronic key 50 is an example of the "portable device".

The user terminal 70 is a portable terminal that the user of the vehicle 20 possesses. As examples, a portable personal computer (a notebook PC), a smart phone, a tablet terminal or the like can be used as the user terminal 70. In the present embodiment, as an example, the user terminal 70 is a smart phone.

Figure 2:
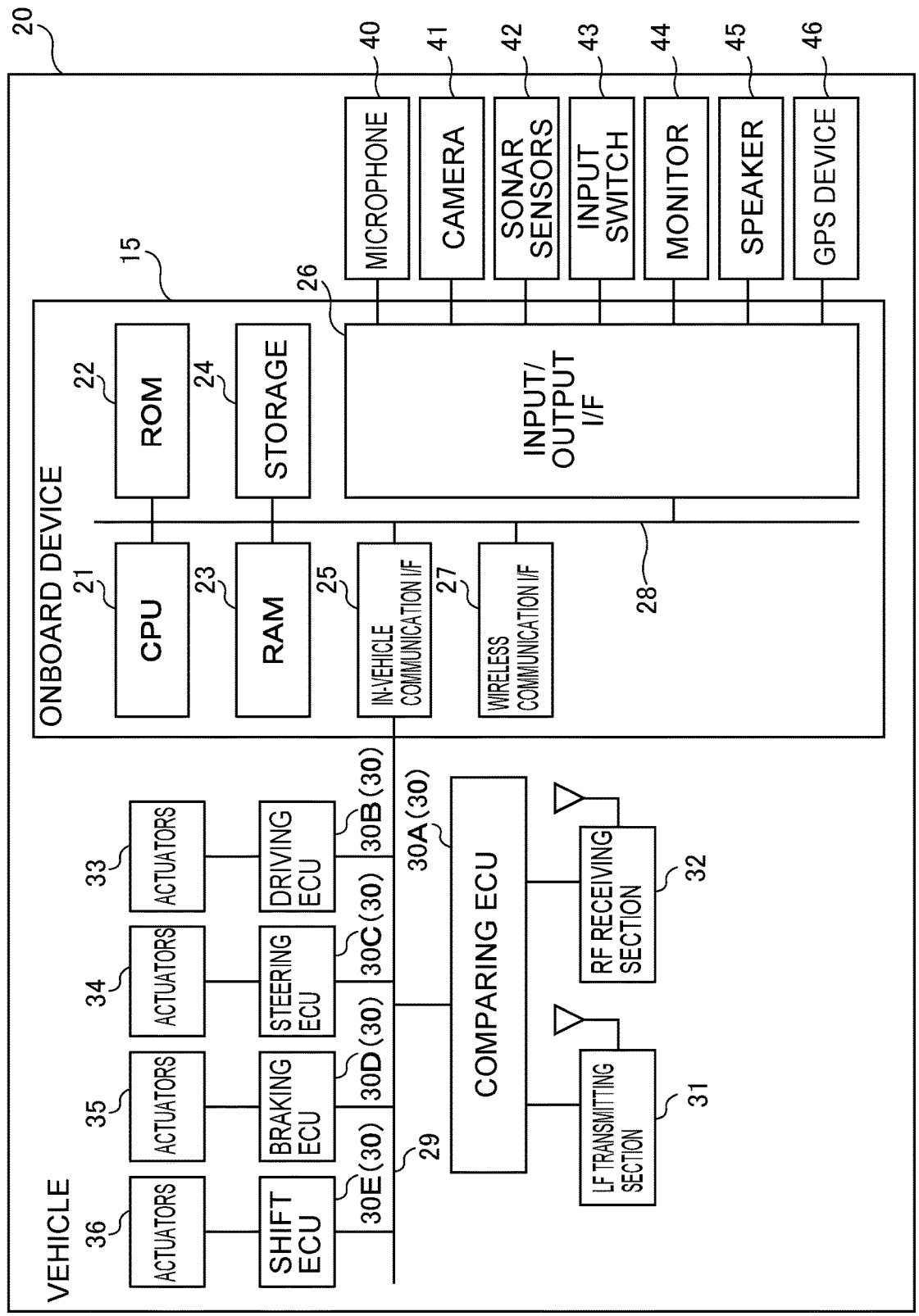
FIG. 2 is a block drawing illustrating hardware structures of a vehicle relating to the present embodiment.

Hardware structures of the vehicle 20 are described next. FIG. 2 is a block drawing illustrating the hardware structures of the vehicle 20.

As illustrated in FIG. 2, the vehicle 20 is structured to include an onboard device 15, plural ECUs (Electronic Control Units) 30, LF (Low Frequency) transmitting section 31, an RF (Radio Frequency) receiving section 32, actuators 33~36, a microphone 40, a camera 41, sonar sensors 42, an input switch 43, a monitor 44, a speaker 45, and a GPS device 46.

The onboard device 15 is structured to include a CPU 21 (Central Processing Unit), a ROM 22 (Read Only Memory), a RAM 23 (Random Access Memory), a storage 24, an in-vehicle communication I/F (InterFace) 25, an input/output I/F 26 and a wireless communication I/F 27. The CPU 21, the ROM 22, the RAM 23, the storage 24, the in-vehicle communication I/F 25, the input/output I/F 26 and the wireless communication I/F 27 are connected to as to be able to communicate with one another via an internal bus 28.

The CPU 21 is a central computing processing unit, and executes various programs and controls the respective sections. Namely, the CPU 21 reads-out programs from the ROM 22 or the storage 24, and executes the programs by using the RAM 23 as a workspace. The CPU 21 carries out control of the above-described respective structures, and various computing processings, in accordance with programs that are recorded in the ROM 22 or the storage 24.

The ROM 22 stores various programs and various data. The RAM 23 temporarily stores programs and data as a workspace.

The storage 24 is structured by a storage device such as an HDD (Hard Disk Drive), an SSD (Solid State Drive), a flash memory or the like, and stores various programs and various data. In the present embodiment, vehicle ID information that is ID (identification) information unique to the vehicle 20 is stored in the storage 24.

The in-vehicle communication I/F 25 is an interface for connection with the ECUs 30. This interface uses communication standards in accordance with CAN protocol. The in-vehicle communication I/F 25 is connected to an external bus 29.

The plural ECUs 30 are provided for the functions of the vehicle 20 respectively. In the present embodiment, a comparing ECU 30A, a driving ECU 30B, a steering ECU 30C, a braking ECU 30D, and a shift ECU 30E are provided.

The LF transmitting section 31 and the RF receiving section 32 are connected to the comparing ECU 30A.

The LF transmitting section 31 are communication units that carry out wireless communication in the LF band, and transmit LF signals, which are radio waves in the LF band, to an LF receiving section 65 that is described later. The LF transmitting section 31 are set at plural places of the vehicle 20. The LF signal is an example of the "predetermined signal".

The RF receiving section 32 is a communication unit that carries out wireless communication in the RF band, and receives RF signals, which are radio waves in the RF band, from an RF transmitting section 66 that is described later.

The actuators 33 are connected to the driving ECU 30B. As an example, an electric motor, an engine and the like are included among the actuators 33. In the present embodiment, owing to the driving ECU 30B controlling the actuators 33, the vehicle 20 can be made to travel even if the driver does not operate the accelerator pedal.

The actuators 34 are connected to the steering ECU 30C. As an example, the electric power steering device is included among the actuators 34. In the present embodiment, owing to the steering ECU 30C controlling the actuators 34, the steered wheels can be turned and the vehicle 20 can be turned, even the driver does not operate the steering wheel.

The actuators 35 are connected to the braking ECU 30D. As an example, the braking actuator that operates the brakes by electromagnetic driving force is included among the actuators 35. In the present embodiment, owing to the braking ECU 30D controlling the actuators 35, the vehicle 20 can be stopped even if the driver does not operate the brake pedal.

The actuators 36 are connected to the shift ECU 30E. As an example, a shift actuator that carries out switching of the shift position (D, R, P and the like) of the drive transmission mechanism, and switching between locking of the shift mechanism and releasing of locking of the shift mechanism, and the like is included among the actuators 36. In the present embodiment, owing to the shift ECU 30E being controlled by the actuators 36, the shift position can be switched, locking of the shift mechanism can be carried out, and the locking of the shift mechanism can be released even if the driver does not operate the shift lever.

The input/output I/F 26 is an interface for communicating with the microphone 40, the camera 41, the sonar sensors 42, the input switch 43, the monitor 44, the speaker 45, and the GPS device 46 that are installed in the vehicle 20.

The microphone 40 is provided at a front pillar, the dashboard or the like of the vehicle 20, and is a device that picks-up the voice emitted by the user of the vehicle 20. Note that the microphone 40 may be provided at the camera 41 that is described hereinafter.

As an example, the camera 41 is structured to include a solid-state imaging element such as a CCD (Charge Coupled Device) image sensor or a CMOS (Complementary Metal Oxide Semiconductor) image sensor or the like. The camera 41 is, as an example, provided at the front portion of the vehicle 20, and captures image of the region ahead of the vehicle. The images captured by the camera 41 are used, for example, in order to recognize the inter-vehicle distance between the own vehicle and the preceding vehicle that is traveling ahead of the own vehicle, as well as the traffic lanes, traffic signals and the like. The images captured by the camera 41 are stored in the storage 24. Note that the camera 41 may be structured by an imaging device that has another application, such as a drive recorder or the like. Further, the camera 41 may be connected to the onboard device 15 via the ECUs 30 (e.g., a camera ECU).

The sonar sensors 42 are provided at the four corners of the vehicle 20 or the like, and are devices that detect the distances between the vehicle 20 and obstacles by using ultrasonic waves.

The input switch 43 is provided at the instrument panel, the center console, the steering wheel or the like, and is a switch at which operation by the finger of the driver is inputted. For example, a push-button-type ten key, a touch pad, or the like can be employed as the input switch 43.

The monitor 44 is provided at the instrument panel or the meter panel or the like, and is a liquid crystal monitor for suggesting operations relating to the functions of the vehicle 20, and displaying images relating to explanations of these functions. The monitor 44 may be provided as a touch panel that also has the function of the input switch 43.

The speaker 45 is provided at the instrument panel, the center console, a front pillar, the dashboard or the like, and is a device for suggesting operations relating to the functions of the vehicle 20, and outputting a voice relating to explanations of these functions. Note that the speaker 45 may be provided at the monitor 44.

The GPS device 46 is a device that measures the current position of the vehicle 20. The GPS device 46 includes an unillustrated antenna that receives signals from GPS satellites. Note that the GPS device 46 may be connected to the onboard device 15 via a car navigation system that is connected to the ECUs 30 (e.g., a multimedia ECU).

The wireless communication I/F 27 is a communication unit that carries out wireless communication using Bluetooth®, and carries out BLE (Bluetooth® Low Energy) communication with a communication section 77 that is described later.

Figure 3:
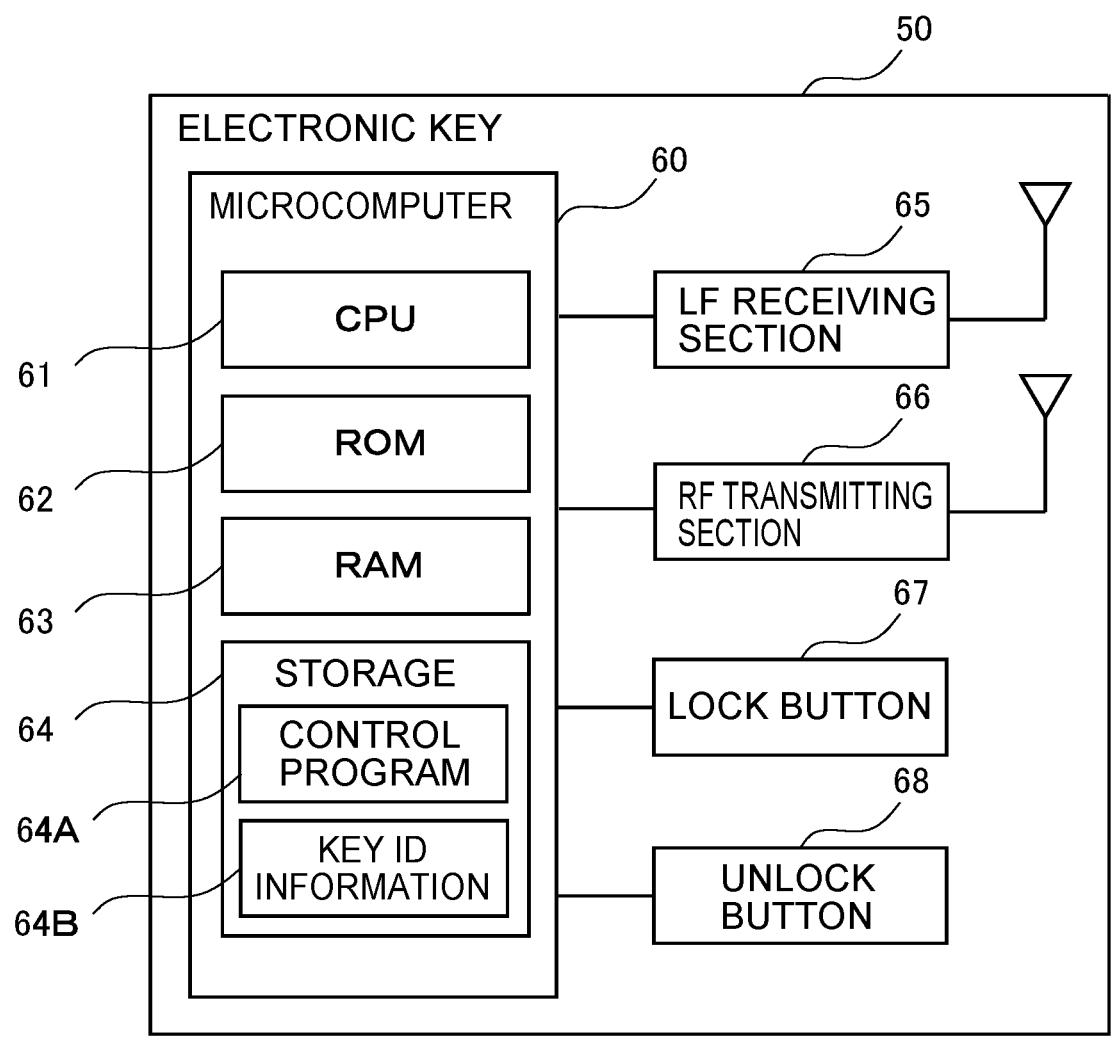
FIG. 3 is a block drawing illustrating hardware structures of an electronic key relating to the present embodiment.

Hardware structures of the electronic key 50 are described next. FIG. 3 is a block drawing illustrating hardware structures of the electronic key 50.

As illustrated in FIG. 3, the electronic key 50 includes a microcomputer 60, the LF receiving section 65, the RF transmitting section 66, a lock button 67, and an unlock button 68.

The microcomputer 60 is structured to include a CPU 61, a ROM 62, a RAM 63 and a storage 64. A control program 64A, which is for executing at least the setting processing that is described later, and key ID information 64B, which is information of the ID unique to the electronic key 50, are stored in the storage 64.

The LF receiving section 65 is a communication unit that carries out wireless communication in the LF band, and receives LF signals from the LF transmitting section 31.

The RF transmitting section 66 is a communication unit that carries out wireless communication in the RF band, and transmits RF signals to the RF receiving section 32.

The lock button 67 is a button that can be operated in order to lock the doors of the vehicle 20. The lock button 67 is an example of the "locking portion".

The unlock button 68 is a button that can be operated in order to unlock the doors of the vehicle 20. The unlock button 68 is an example of the "unlocking portion".

Note that the doors, which are locked by the lock button 67 being operated or are unlocked by the unlock button 68 being operated, are the driver's seat door at the driver's seat side, the front passenger's seat door at the front passenger's seat side, and rear doors at the rear portion of the vehicle 20.

At the electronic key 50, when the lock button 67 is operated, the RF transmitting section 66 transmits an RF signal that includes a lock request to lock the doors. Further, at the electronic key 50, when the unlock button 68 is operated, the RF transmitting section 66 transmits an RF signal that includes an unlock request to unlock the doors.

In contrast, at the vehicle 20, in a case in which an RF signal including a lock request is received, the onboard device 15 controls an unillustrated door lock device so as to set all of the doors in a locked state. Further, at the vehicle 20, in a case in which an RF signal including a unlock request is received, the onboard device 15 controls an unillustrated door lock device so as to set all of the doors in an unlocked state.

At the vehicle 20, locking and unlocking of the doors is carried out not only by operation of the electronic key 50, but also by operation of door buttons, which are provided at the driver's seat door and the front passenger's seat door and the like, by the user who possesses the electronic key 50. In this case, on the basis of the electronic key 50 receiving an LF signal transmitted from the vehicle 20, the electronic key 50 transmits an RF signal to the vehicle 20 and thereby notifies the vehicle 20 that the electronic key 50 exists in a range at which the electronic key 50 can receive LF signals from the vehicle 20. Then, in a case in which the vehicle 20 receives the RF signal transmitted from the electronic key 50, when a door button is operated by a user, the onboard device 15 controls the door lock device so as to set all of the doors in the locked state or the unlocked state.

Here, the electronic key 50 has, as sensitivities of receiving the LF signals transmitted from the vehicle 20, two types of sensitivities that are standard sensitivity and high sensitivity that is a higher reception sensitivity than the standard sensitivity. The standard sensitivity is an example of the "first sensitivity", and the high sensitivity is an example of the "second sensitivity". In the present embodiment, the reception sensitivity is usually set to the standard sensitivity. When the unlock button 68 is operated in a case in which the reception sensitivity is the standard sensitivity, the reception sensitivity is changed from the standard sensitivity to the high sensitivity. When the reception sensitivity becomes high sensitivity, the electronic key 50 can receive LF signals at positions that are further from the vehicle 20 than in the case of standard sensitivity, even if the signal intensities of the LF signals transmitted from the vehicle 20 are the same. Details thereof are described later.

Figure 4:
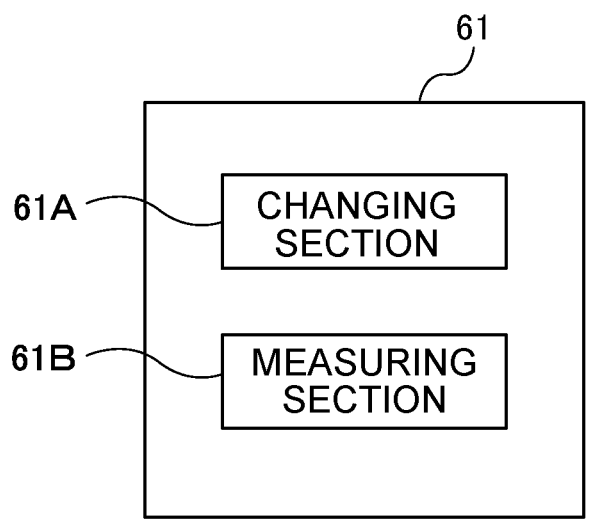
FIG. 4 is a block drawing illustrating an example of functional structures of the electronic key relating to the present embodiment.

The functional structures of the electronic key 50 are described next. FIG. 4 is a block drawing illustrating an example of the functional structures of the electronic key 50.

As illustrated in FIG. 4, the CPU 61 of the electronic key 50 has, as the functional structures thereof, a changing section 61A and a measuring section 61B. These respective functional structures are realized by the CPU 61 reading-out the control program 64A that is stored in the storage 64, and executing the control program 64A. The CPU 61 is an example of the processor.

When the unlock button 68 is operated in a case in which the reception sensitivity of LF signals is the standard intensity, the changing section 61A changes the reception sensitivity to high sensitivity that is a higher reception sensitivity than the standard sensitivity. The LF receiving section 65 has an amp for changing the reception sensitivity, and the reception sensitivity is changed due to the amount of current flowing to the amp being adjusted. The changing section 61A increases the reception sensitivity by increasing the amount of current flowing to the amp, and changes the reception sensitivity from the standard sensitivity to the high sensitivity.

Further, in a case in which a predetermined time has elapsed since the reception sensitivity of LF signals being changed to high sensitivity, the changing section 61A changes the reception sensitivity to the standard sensitivity. Moreover, when the lock button 67 is operated in a case in which the reception sensitivity of LF signals is high sensitivity, the changing section 61A changes the reception sensitivity to the standard sensitivity. As described above, in a case in which the reception sensitivity is changed from high sensitivity to standard sensitivity, the changing section 61A lowers the reception sensitivity by decreasing the amount of current flowing to the amp, and changes the reception sensitivity from high sensitivity to standard sensitivity.

The measuring section 61B has a timer that measures the time elapsed from the time when the reception sensitivity is set to high sensitivity. Each time that that elapsed time is measured, the measuring section 61B resets the timer, and starts measuring.

Figure 5:
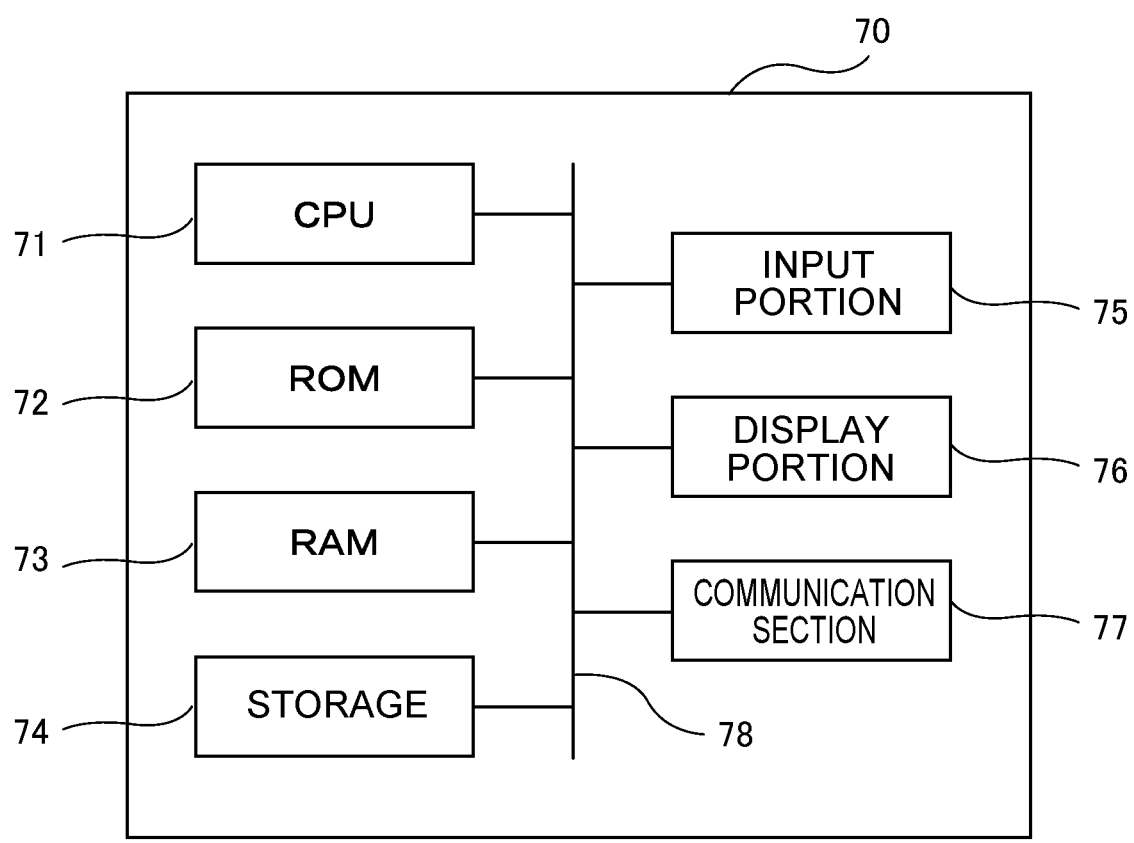
FIG. 5 is a block drawing illustrating hardware structures of a user terminal relating to the present embodiment.

Hardware structures of the user terminal 70 are described next. FIG. 5 is a block drawing illustrating the hardware structures of the user terminal 70.

As illustrated in FIG. 5, the user terminal 70 has a CPU 71, a ROM 72, a RAM 73, a storage 74, an input portion 75, a display portion 76, and the communication section 77. These structures are connected so as to be able to communicate with one another through a bus 78.

The CPU 71 is a central computing processing unit, and executes various programs and controls the respective sections. Namely, the CPU 71 reads-out programs from the ROM 72 or the storage 74, and executes the programs by using the RAM 73 as a workspace. The CPU 71 carries out control of the above-described respective structures, and various computing processings, in accordance with the programs that are recorded in the ROM 72 or the storage 74.

The ROM 72 stores various programs and various data. The RAM 73 temporarily stores programs and data as a workspace.

The storage 74 is structured by a storage device such as an HDD, an SSD, a flash memory or the like, and stores various programs and various data.

The input portion 75 includes various buttons, a microphone, a camera and the like, and is used in order to carry out various types of input.

The display portion 76 is, for example, a liquid crystal display, and displays various information. The display portion 76 may be a touch panel type display so as to function as the input portion 75 as well.

The communication section 77 is a communication unit that carries out wireless communication using Bluetooth®, and carries out BLE communication with the wireless communication I/F 27.

Figure 6:
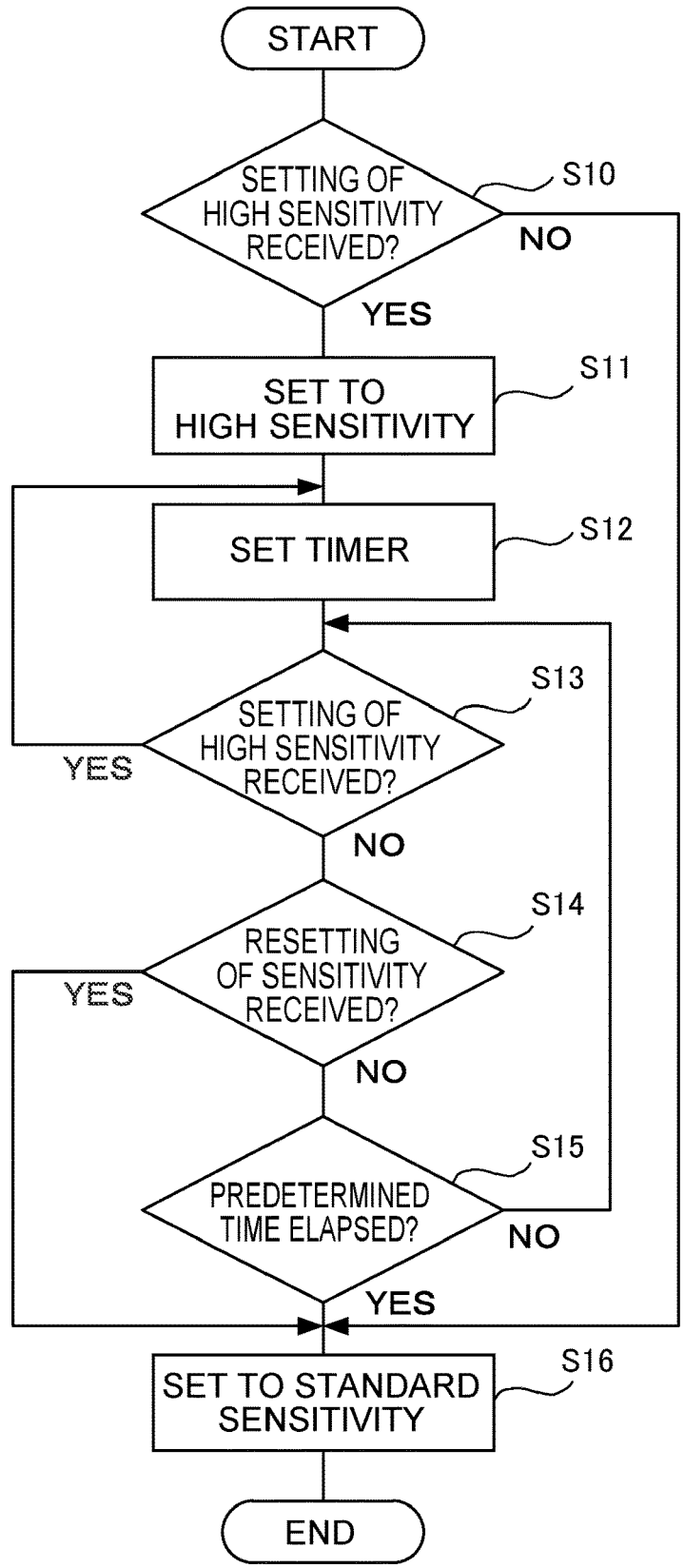
FIG. 6 is a flowchart illustrating the flow of setting processing relating to the present embodiment.

FIG. 6 is a flowchart illustrating the flow of setting processing that sets the reception sensitivity of the electronic key 50. The setting processing is carried out due to the CPU 61 reading-out the control program 64A from the storage 64, and expanding and executing the program in the RAM 63.

Note that it is assumed that the reception sensitivity before the setting processing is carried out is set to the standard sensitivity.

In step S10 shown in FIG. 6, the CPU 61 judges whether or not a setting of high sensitivity has been received. If it is judged that a setting of high sensitivity has been received (step S10: YES), the CPU 61 moves on to step S11. On the other hand, if the CPU 61 judges that a setting of high sensitivity has not been received (step S10: NO), the CPU 61 moves on to step S16. As an example, the CPU 61 judges that a setting of high sensitivity has been received in a case in which the unlock button 68 is operated by a user of the vehicle 20.

In step S11, the CPU 61 sets the reception sensitivity to high sensitivity. Then, the CPU 61 moves on to step S12.

In step S12, the CPU 61 carries out setting of the timer. Then, the CPU 61 moves on to step S13. As the setting of the timer, the CPU 61 resets the timer, and thereafter, starts measuring of the time elapsed from the time when the reception sensitivity was set to high sensitivity.

In step S13, the CPU 61 judges whether or not a setting of high sensitivity has been received. If it is judged that a setting of high sensitivity has been received (step S13: YES), the CPU 61 returns to step S12. On the other hand, if the CPU 61 judges that a setting of high sensitivity has not been received (step S13: NO), the CPU 61 moves on to step S14.

In step S14, the CPU 61 judges whether or not resetting of the sensitivity has been received. If it is judged that resetting of the sensitivity has been received (step S14: YES), the CPU 61 moves on to step S16. On the other hand, if the CPU 61 judges that resetting of the sensitivity has not been received (step S14: NO), the CPU 61 moves on to step S15. As an example, in a case in which the lock button 67 is operated by a user of the vehicle 20, it is judged that resetting of the sensitivity has been received.

In step S15, the CPU 61 judges whether or not a predetermined time has elapsed from the start of measuring by the timer in step S12. If it is judged that the predetermined time has elapsed (step S15: YES), the CPU 61 moves on to step S16. On the other hand, if the CPU 61 judges that the predetermined time has not elapsed (step S15: NO), the CPU 61 returns to step S13.

In step S16, the CPU 61 sets the reception sensitivity to standard sensitivity. Then, the CPU 61 ends the setting processing.

Next, explanation is given of the flow of processings by which the doors of the vehicle 20 are locked or unlocked due to the user who possesses the electronic key 50 operating a door button. Hereinafter, as an example, explanation is given of the flow of processings by which the doors of the vehicle 20 are unlocked due to the user operating a door button. The unlocking of the doors can be executed in a case in which the vehicle 20 has succeeded in authenticating the electronic key 50.

Here, the authenticating of the electronic key 50 is carried out as follows for example. The comparing ECU 30A transmits an LF signal from the LF transmitting section 31 to the LF receiving section 65. When the LF receiving section 65 receives the LF signal, the CPU 61 of the electronic key 50 transmits an RF signal, which includes the key ID information 64B, from the RF transmitting section 66 to the RF receiving section 32.

The comparing ECU 30A compares the key ID information 64B and the vehicle ID information stored in the storage 24, and, in a case in which the key ID information 64B and the vehicle ID information match, the comparing ECU 30A judges that authentication of the electronic key 50 is successful. On the other hand, in a case in which the RF signal is not received within a predetermined time from the transmission of the LF signal, or in a case in which the key ID information 64B and the vehicle ID information do not match, the comparing ECU 30A judges that authentication of the electronic key 50 has failed.

Figure 7:
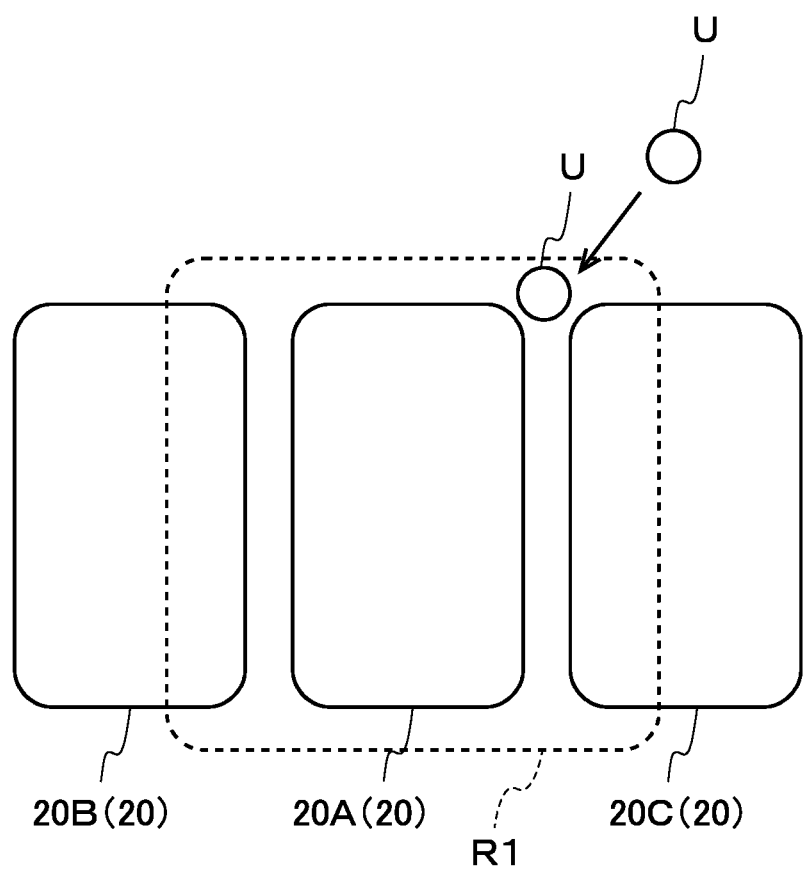
FIG. 7 is a first explanatory drawing of the driving assistance system relating to the present embodiment.

FIG. 7 is a first explanatory drawing of the driving assistance system 10. FIG. 7 illustrates a situation in which the doors of the vehicle 20 are unlocked due to the user operating a door button in a case in which the reception sensitivity of the LF signal is the standard sensitivity.

Here, in FIG. 7, the three vehicles 20 that are vehicle 20A, vehicle 20B and vehicle 20C are parked in a row. User U illustrated in FIG. 7 is the driver of the vehicle 20A, and operates a door button of the vehicle 20A. Moreover, range R1 illustrated by the dashed line in FIG. 7 is the range in which the LF signal, which is transmitted from the vehicle 20A, can be received in a case in which the LF signal reception sensitivity of the electronic key 50 that the user U possesses is the standard sensitivity.

First, in order to unlock the doors of the vehicle 20A, the user U approaches the vehicle 20A up to entering within the range R1. When the user U enters into the range R1, the electronic key 50 that the user U possesses receives an LF signal transmitted from the vehicle 20A, and transmits an RF signal, which includes the key ID information 64B, to the vehicle 20A. The vehicle 20A that has received the RF signal compares the key ID information 64B and the vehicle ID information stored in the storage 24. In a case in which the key ID information 64B and the vehicle ID information match, the vehicle 20A judges that authentication of the electronic key 50 is successful. As a result thereof, the doors of the vehicle 20A can be unlocked by operation of a door button of the vehicle 20A.

Then, the user U operates a door button of the vehicle 20A. As a result thereof, the onboard device 15 of the vehicle 20A controls the door lock device to set all of the doors in the unlocked state.

Driving assistance of the vehicle 20 that is carried out at the driving assistance system 10 is described next. This driving assistance is an operation that advances or reverses the vehicle 20 in accordance with operation of the user terminal 70, in a situation in which the user of the vehicle 20 is outside of the vehicle. In the same way as at the time of the unlocking of the doors of the vehicle 20 due to operation of a door button by the user who possesses the electronic key 50 that is illustrated in FIG. 7, this driving assistance operation can be executed in a case in which the vehicle 20 is successful in authenticating the electronic key 50. A case in which the vehicle 20 succeeds in authenticating the electronic key 50 is an example of a "case in which it has been confirmed that the portable device has received a predetermined signal".

Figure 8:
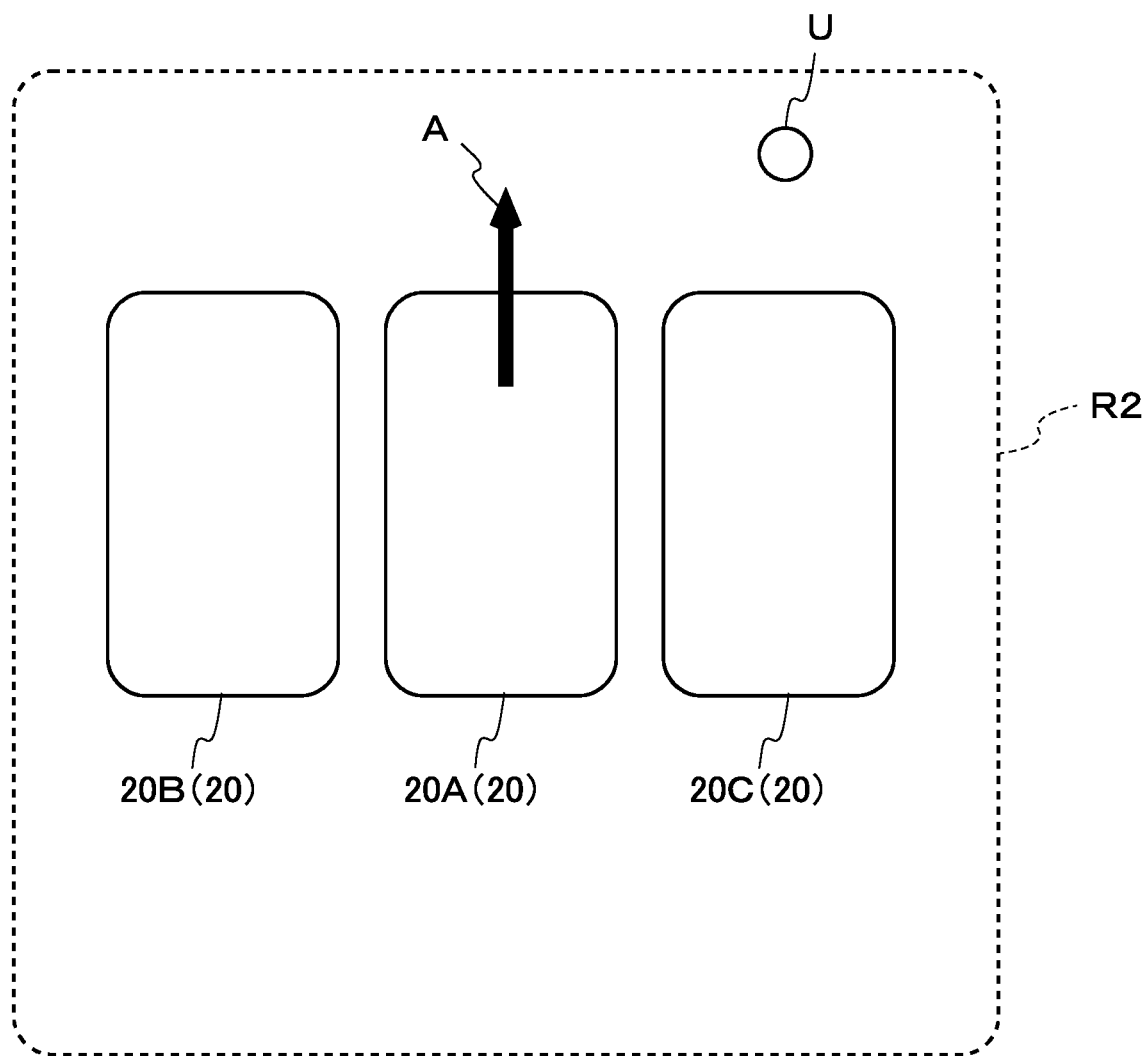
FIG. 8 is a second explanatory drawing of the driving assistance system relating to the present embodiment.

FIG. 8 is a second explanatory drawing of the driving assistance system 10. FIG. 8 illustrates a situation of carrying out the driving assistance operation (hereinafter called "remote garage exiting") of causing the vehicle 20 to advance in accordance with operation of the user terminal 70 in a case in which the reception sensitivity of the LF signal is high sensitivity. Note that explanation of the portions of FIG. 8 that are common to FIG. 7 is omitted. Here, in the driving assistance system 10, the LF signal that is transmitted from the vehicle 20 to the electronic key 50 is called a signal for executing the driving assistance operation of advancing or reversing the vehicle 20 in accordance with operation of the user terminal 70.

In FIG. 8, the reception sensitivity has been changed to high sensitivity on the basis of the user U having operated the unlock button 68, and the range in which the LF signal transmitted from the vehicle 20A can be received is range R2 which is broader than the range R1 illustrated in FIG. 7. Note that, in FIG. 8, on the basis of the user U having operated the unlock button 68, all of the doors of the vehicle 20A are in the unlocked state.

In FIG. 8, because the user U exists within the range R2, the electronic key 50 possessed by the user U receives the LF signal transmitted from the vehicle 20A, without the user U approaching the vehicle 20A any further. Thereafter, the electronic key 50 transmits an RF signal including the key ID information 64B to the vehicle 20A. The vehicle 20A that has received the RF signal compares the key ID information 64B and the vehicle ID information stored in the storage 24, and, in a case in which the key ID information 64B and the vehicle ID information match, judges that authentication of the electronic key 50 is successful. As a result thereof, remote garage exiting can be executed as a driving assistance operation.

After authentication of the electronic key 50 is successful, the user U operates a predetermined application on the user terminal 70, and causes an operation signal for remote garage exiting to be transmitted from the user terminal 70 to the vehicle 20A. At the vehicle 20A that receives the operation signal, the driving ECU 30B, the steering ECU 30C, the braking ECU 30D and the shift ECU 30E control the respective actuators 33~36 on the basis of the operation signal, and cause the vehicle 20A to advance in the direction of arrow A to a predetermined position. Note that, on the basis of the fact that the vehicle 20A has advanced forward in accordance with operation of the user terminal 70, the onboard device 15 of the vehicle 20A controls the door lock device to set all of the doors in the locked state.

After the vehicle 20A stops at a predetermined position, the user U operates the unlock button 68 and unlocks the doors of the vehicle 20A. Due to the above processes, the remote garage exiting ends.

Note that, in a case of carrying out remote garage exiting, after the vehicle 20 stops at a predetermined position, the doors of the vehicle 20 may be unlocked without receiving an operation of the unlock button 68 by the user. In this case, in a case in which remote garage exiting is carried out after all of the doors of the vehicle 20 have been set in the unlocked state on the basis of the unlock button 68 having been operated, the onboard device 15 controls the door lock device so as to set all of the doors in the unlocked state, on the basis of the fact that the vehicle 20 has stopped at a predetermined position. Moreover, in remote garage exiting, in a case in which the doors of the vehicle 20 are unlocked without receiving an operation of the unlock button 68 by the user, notice may be given of information expressing that the doors have been unlocked by at least one of the vehicle 20, the electronic key 50 and the user terminal 70.

Further, in remote garage exiting, in a case in which an RF signal including a locking request or an RF signal including an unlocking request is received from the electronic key 50 during the time the vehicle 20 is being advanced forward, the braking ECU 30D controls the actuators 35 and stops the vehicle 20.

Here, in the driving assistance system 10, remote garage exiting can be executed not only in a case in which the LF signal reception sensitivity of the electronic key 50 is high sensitivity, but also in a case in which the reception sensitivity is the standard sensitivity. However, in a case in which the reception sensitivity is the standard sensitivity, as illustrated in FIG. 7, after the user approaches the vehicle 20 up until the range R1 that is the range in which LF signals can be received, the user must move away from the vehicle 20 in order to clear the way, and this is inconvenient for the user. Accordingly, in a case of executing remote garage exiting, it is preferable to change the LF signal reception sensitivity of the electronic key 50 to high sensitivity.

As described above, the electronic key 50 has the unlock button 68 configured to enable an operation for unlocking the doors of the vehicle 20 is possible. If the unlock button 68 is operated in a case in which the reception sensitivity of the LF signals transmitted by wireless communication from the vehicle 20 is the standard sensitivity, the CPU 61 of the electronic key 50 changes the reception sensitivity to high sensitivity that is a higher reception sensitivity than standard sensitivity. As a result thereof, at the electronic key 50, the reception sensitivity is changed to high sensitivity in a state in which it is recognized that a user of the vehicle 20 has unlocked the doors. Therefore, in a case of carrying out driving assistance under the condition that the electronic key 50 has been detected, convenience for the user can be ensured without any detriment to the security of the vehicle 20.

Further, at the electronic key 50, in a case in which a predetermined time has elapsed since the changing the reception sensitivity to high sensitivity, the CPU 61 changes the reception sensitivity to standard sensitivity. As a result thereof, at the electronic key 50, even if the user of the vehicle 20 forgets that the reception sensitivity has been changed to high sensitivity, the reception sensitivity is automatically changed to standard sensitivity after a predetermined time elapses, and therefore, security risks to the vehicle 20 are reduced.

Further, the electronic key 50 has the lock button 67 configured to enable an operation for locking the doors of the vehicle 20 is possible. When the lock button 67 is operated in a case in which the reception sensitivity is high sensitivity, the CPU 61 of the electronic key 50 changes the reception sensitivity to standard sensitivity. As a result thereof, at the electronic key 50, the reception sensitivity can be changed to standard sensitivity in accordance with operation of the electronic key 50. Therefore, due to the reception sensitivity being changed to the standard sensitivity at the time when the user moves away from the vehicle 20, security risks to the vehicle 20 can be reduced.

Further, the driving assistance system 10 has the electronic key 50, the vehicle 20 that can communicate wirelessly with the electronic key 50, and the user terminal 70 that can communicate with the vehicle 20. In the driving assistance system 10, the vehicle 20 executes the driving assistance operation of advancing or reversing the vehicle 20 in accordance with operation of the user terminal 70 in a case in which authentication of the electronic key 50 is successful, which is a case of confirming that the electronic key 50 has received the transmitted LF signal. As a result thereof, in the driving assistance system 10, in a situation in which the user of the vehicle 20 is outside of the vehicle, in a case in which the driving assistance operation of advancing or reversing the vehicle 20 is executed in accordance with operation of the user terminal 70 under the condition that the electronic key 50 has been detected, convenience for the user can be ensured without any detriment to the security of the vehicle 20.

Further, the above-described electronic key 50 can carry out both locking of the doors of the vehicle 20 and changing of the LF signal reception sensitivity to standard sensitivity by operation of the lock button 67, and can carry out both unlocking of the doors of the vehicle 20 and changing of the LF signal reception sensitivity to high sensitivity by operation of the unlock button 68. In this way, the electronic key 50 does not have a button that is used exclusively to enable operation for changing the reception sensitivity of LF signals, and therefore, the reception sensitivity of LF signals can be changed by a simple structure that uses existing buttons.

(Other Points)

In the above-described embodiment, the lock button 67 and the unlock button 68 are provided as buttons of the electronic key 50, but other buttons may be provided in addition thereto. For example, an open/close button for opening/closing a back door of the vehicle 20 may be provided as a button of the electronic key 50.

Although the electronic key 50 is used as an example of the portable device in the above-described embodiment, the present disclosure is not limited to this, and examples of the portable device are portable terminals such as a smart phone, a tablet terminal and the like. For example, in a case in which a portable terminal is an example of the portable device, in the driving assistance system 10, the user terminal 70 may be an example of the portable device, or a portable terminal other than the user terminal 70 may be an example of the portable device. Further, in a case in which an example of the portable device is made to be a portable terminal, icons that are displayed on the screen of the portable terminal are examples of the locking portion and the unlocking portion.

In the above-described embodiment, in a case in which the LF signal reception sensitivity of the electronic key 50 is changed, change information that expresses that the reception sensitivity has been changed may be reported at at least one of the vehicle 20, the electronic key 50 and the user terminal 70. Further, different change information may be reported in a case in which the reception sensitivity is changed to high sensitivity and in a case in which the reception sensitivity is changed to standard sensitivity. For example, if predetermined sounds are output from the electronic key 50 in cases in which the reception sensitivity is changed, a high-pitched sound may be output when the reception sensitivity is changed to high sensitivity, and a low-pitched sound may be output when the reception sensitivity is changed to standard sensitivity.

Note that any of various types of processors other than a CPU may execute the setting processing that is executed due to the CPU 61 reading software (a program) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the setting processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above-described embodiment describes a form in which the control program 64A is stored in advance (is installed) in the storage 64, but the present disclosure is not limited to this. The control program 64A may be provided in a form of being recorded on a storage medium such as a CD-ROM (Compact Disk Read Only Memory), a DVD-ROM (Digital Versatile Disk Read Only Memory), a USB (Universal Serial Bus) memory, or the like. Further, the control program 64A may in a form of being downloaded from an external device over a network.

What is claimed is:

1. A portable device, comprising:
an unlock button configured to enable an operation for unlocking a door of a vehicle; and
a processor,
wherein the processor is configured to:
when the unlock button is operated in a case in which a reception sensitivity of a predetermined signal that is transmitted by wireless communication from the vehicle is a first sensitivity, change the reception sensitivity to a second sensitivity that is a higher reception sensitivity than the first sensitivity, and
change the reception sensitivity to the first sensitivity in a case in which a predetermined time has elapsed since changing the reception sensitivity to the second sensitivity.

2. The portable device of claim 1, comprising a lock button configured to enable an operation for locking the door of the vehicle,
wherein the processor changes the reception sensitivity to the first sensitivity when the lock button is operated in a case in which the reception sensitivity is the second sensitivity.

3. A driving assistance system, comprising:
the portable device of claim 1;
a vehicle configured to communicate wirelessly with the portable device; and
a user terminal configured to communicate with the vehicle,
wherein the vehicle executes a driving assistance operation of advancing or reversing the vehicle in accordance with operation of the user terminal, in a case in which it has been confirmed that the portable device has received a predetermined signal that has been transmitted.

4. A control method, according to which a computer executes processing comprising:
receiving an operation for unlocking a door of a vehicle;
when the operation is carried out in a case in which a reception sensitivity of a predetermined signal that is transmitted by wireless communication from the vehicle is a first sensitivity, changing the reception sensitivity to a second sensitivity that is a higher reception sensitivity than the first sensitivity; and
changing the reception sensitivity to the first sensitivity in a case in which a predetermined time has elapsed since changing the reception sensitivity to the second sensitivity.

5. A non-transitory storage medium storing a control program executable by a computer to perform processing, the processing comprising:
receiving an operation for unlocking a door of a vehicle;
when the operation is carried out in a case in which a reception sensitivity of a predetermined signal that is transmitted by wireless communication from the vehicle is a first sensitivity, changing the reception sensitivity to a second sensitivity that is a higher reception sensitivity than the first sensitivity; and changing the reception sensitivity to the first sensitivity in a case in which a predetermined time has elapsed since changing the reception sensitivity to the second sensitivity.

\* \* \* \* \*